US006036799A

United States Patent [19]

Uno

[11] Patent Number: 6,036,799

[45] Date of Patent: Mar. 14, 2000

[54] ANTI-COUNTERFEIT STRUCTURE OF PASSPORT AND METHOD FOR MANUFACTURING THE SAME

[76] Inventor: Tadao Uno, 1-84, Matsugaoka 1-chome, Chigasaki-shi, Kanagawa-ken, Japan

[21] Appl. No.: 09/149,132

[22] Filed: Sep. 8, 1998

Related U.S. Application Data

[62] Division of application No. 08/712,548, Sep. 11, 1996, Pat. No. 5,897,144.

[30] Foreign Application Priority Data

Jul. 30, 1996 [JP] Japan .................................... 8-199997

[51] Int. Cl.[7] ...................................................... B32B 31/00

[52] U.S. Cl. .............................................. 156/93; 156/292

[58] Field of Search ....................................... 156/93, 292

[56] References Cited

U.S. PATENT DOCUMENTS 5,211,424 5/1993 Bliss ...................................... 281/15.1

5,624,514 4/1997 Frowein ................................ 156/93 X

*Primary Examiner*—Francis J. Lorin

*Attorney, Agent, or Firm*—Wenderoth, Lind & Ponack, L.L.P.

[57] ABSTRACT

A method for manufacturing a passport comprises combining data sheet of an individual with a plurality of visa sheets binding the combined sheets and bound by a thread along a central folding line, and laminating an individual's data printing page of the data sheet with a protective film composed of a see-through synthetic resin film. An anti-counterfeit structure of the manufactured passport is characterized in that the protective film is laminated over a gutter portion of the data sheet including the central folding line, and the thread binding is formed through the laminated area of the gutter portion.

4 Claims, 11 Drawing Sheets

FIG.4(A')

ANTI-COUNTERFEIT STRUCTURE OF PASSPORT AND METHOD FOR MANUFACTURING THE SAME

This application is a divisional of Ser. No. 08/712,548, filed Sep. 11, 1996, now U.S. Pat. No. 5,897,144

BACKGROUND OF THE INVENTION

1. Field of the Invention

This invention relates to an improved anti-counterfeit structure of a passport containing data of an individual, and a method for consistently manufacturing the same.

2. Brief Description of the Prior Art

A passport is an official certificate issued to a person who wants to make a trip to foreign countries by an authority of the government of the country in which the person lives, certifying the nationality and social status of the person and soliciting the governments of the visiting foreign countries to render various benefits and protections required to the person. Because of the nature of the passport, it is vitally important that the passport is protected from being counterfeited.

In manufacturing a conventional passport, a so-called virgin passport having no data of an individual printed thereon is bound, and thereafter data of an individual, among other information, are printed on the passport already bound. That is, the step for binding a passport and the step for printing data of an individual, etc. are clearly performed separately.

More specifically, for manufacturing the conventional passport, as shown in FIG. 1, a data sheet I for printing thereon data of an individual and visa sheets 2 for stamping a seal verifying entry and exit from a certain country are combined together, the sheets 1 and 2 are bound with a thread using a sewing machine along a central folding line, and then a cover sheet is attached to the outer surface of the data sheet 1 thread-bound with the use of an adhesive agent. Reference numeral 4 denotes a binding thread. For protecting the data of an individual and protecting the passport against counterfeiting the data sheet 1 is attached to the inner surface of the cover sheet 3 with the use of an adhesive agent as above described, or a protective film 5 composed of a see-through synthetic resin film is laminated with an inner surface of a page of the data sheet 1 showing the data of an individual, instead of attaching the data sheet 1 to the cover sheet 3. The data of an individual are printed directly on the data sheet 1 or shown on the protective film to be laminated with the data sheet by printing or the like.

In binding the passport, the protective film 5 is preliminarily bound with a thread together with the sheets 1 and 2 and then laminated, or the protective film 5 is bound without being preliminarily bound with a thread and laminated after the data of an individual are printed. From the view-point of workability, it is mostly practiced that a virgin passport obtained by binding the protective film 5 together with other sheets is prepared and then the data of an individual are printed thereon.

More specifically, the protective film 5 has an area large enough to fully cover the individual's data printing page. The protective film 5 is provided at one end edge of the protective film 5 with a thread-binding width 5*a* extending to the surface of the guttering portion of the data sheet 1 beyond the central folding line (thread-binding line) Y. The thread-binding width 5*a* is bound together with the other sheets 1 and 2 by the binding thread 4 and then, the cover sheet 3 is bonded to the outer surface of the data sheet 1.

That is, a virgin passport is prepared by binding the data sheet 1, the visa sheet 2 and the protective film 5 with the binding thread 4 and attaching the cover sheet 3 to the outer surface of the data sheet 1 by an adhesive agent during one binding process. Then, as shown in FIG. 2(A), data of an individual are printed on the surface of the data sheet 1 or the surface (surface opposite the data sheet) of the protective film 5 of the virgin passport thus bound by a printing machine 6. After the data of an individual are printed, as shown in FIG. 2(B), the preliminarily bound protective film 5 is placed on the surface of the data sheet 1 and then laminated by a hot plate or high frequency bonding means 7.

This method for laminating the protective film 5 with the surface of the individual's data printing page of the data sheet 1 is effective as an anti-counterfeit countermeasure and therefore, practiced in almost all countries.

However, the employment of this conventional method for preparing a virgin passport obtained by preliminarily thread-binding the protective film 5 in one binding process, printing the data of an individual thereon and then laminating the protective film 5 thereon necessarily makes it impossible to laminate, as shown in FIGS. 2(C) and 2(D), the thread-binding width 5*a* of the protective film 5 with the surface of the gutter portion of the data sheet 1 in the area S1 including the thread-binding line Y and tucked up along one side of the protective film 5.

That is, the protective film 5 forms a laminated area S2 from the line apart from the thread binding line Y to a front end edge of the data sheet and forms a non-laminated area S1 at the thread-binding width 5*a* including the thread-binding line Y. The formation of the non-laminated area S1 adversely affects the anti-counterfeit countermeasure.

Also, the area for printing the data of an individual thereon is limited, and it is practically impossible to print data of an individual and some anti-counterfeit information on the area S1 including the thread-binding line Y.

In case the protective film 5 is preliminarily thread-bound together with other sheets and then laminated, the protective film 5, as shown in FIG. 3, is displaced and/or inclined in a planar direction. This causes an end edge of the film to be expanded and/or the data surface to be exposed.

Furthermore, when the passport is double-folded along the central folding line (thread-binding line), the thread-binding width 5*a* of the protective film 5 is deformed into a generally U-shape from the thread-binding line and interposed in that deformed state between the visa sheet 2 and the cover sheet 3. Accordingly, a pushing-up force is normally applied to the sheets 2 and 3 by the spring effect of the U-shaped thread-binding width 5*a*. In addition, as previously mentioned, in order that the thread-binding width 5*a* is not laminated at the area S1 including the thread-binding line Y, the pushing-up force caused by the U-shaped thread-binding width 5*a* normally applies to the binding thread 4 as a tensile force. At the same time, a rubbing repeatedly occurs between the binding thread 4 and the thread-binding width 5*a* through which the binding thread 4 extends every time the passport is opened and closed. This causes expansion and decrease of strength of the binding thread 4.

The problems described above all indicate that the protective film 5 inherently has many problems to be solved as an anti-counterfeit countermeasure.

Moreover, since the conventional method separately includes the step for preliminarily binding a virgin passport in which a protective film is bound and the step for printing the data of an individual on this virgin passport and laminating the same, it takes a long time to issue a passport and the cost for making a passport is increased. Thus, rationalization of the passport issuing system is demanded.

The present invention has been accomplished in view of the above problems.

SUMMARY OF THE INVENTION

It is, therefore, an object of the present invention to provide an improved anti-counterfeit structure of a passport and a method for manufacturing the same, capable of effectively obviating the above-mentioned problems inherent in the prior art.

In order to achieve the above object, there is essentially provided a passport comprising a data sheet of an individual and a plurality of visa sheets combined with the data sheet and bound by a thread along a central folding line. A surface of an individual's data printing page of the data sheet is laminated with a protective film composed of a see-through synthetic resin film. An anti-counterfeit structure of the passport is characterized in that the protective film is laminated over a gutter portion of the data sheet including the thread binding line, and the thread binding is formed through the laminated area of the gutter portion.

From another aspect of the present invention, there is provided a passport comprising a data sheet of an individual and a plurality of visa sheets combined with the data sheet and bound by a thread along a central folding line. A surface of the data sheet is laminated with a protective film composed of a see-through synthetic resin film with individual's data printed thereon. An anti-counterfeit structure of the passport is characterized in that the protective film is laminated over a gutter portion of the data sheet including the thread binding line, and the thread binding is formed through the laminated area of the gutter portion.

It is preferred that the individual's data or anti-counterfeit information is applied over the gutter portion of the data sheet including the thread binding thread.

From another aspect of the invention, there is provided a method for manufacturing a passport comprising the steps of printing data of an individual on an inner individual data printing surface of an individual data sheet; laminating a protective film composed of a see-through synthetic resin film over the individual data print surface of the data sheet and a gutter portion of the data sheet which includes a central folding line of the data sheet after the data of an individual are printed; combining a plurality of visa sheets with the laminated data sheet; binding the combined data sheet and visa sheets with a thread using a sewing machine along the central folding line; double-folding each of the thread-bound sheets along the central folding line; and finish-cutting a front end edge, an upper end edge and a lower end edge of each of the sheets after each of the sheets is double-folded.

From another aspect of the invention, there is provided a method for manufacturing a passport comprising the steps of printing data of an individual on an inner individual data printing surface of an individual data sheet; laminating a protective film composed of a see-through synthetic resin film over the individual data printing surface of the data sheet and a gutter portion of the data sheet which includes a central folding line of the data sheet after the data of an individual are printed; combining a plurality of visa sheets with the laminated data sheet; binding the combined data sheet and visa sheets with a thread using a sewing machine along the central folding line; finish-cutting a peripheral edge portion of each of the thread-bound sheets; and double-folding each of the finish-cut sheets along the central folding line.

From another aspect of the invention, there is provided a method for manufacturing a passport comprising the steps of printing data of an individual on an individual data printing surface of a protective film composed of a see-through synthetic resin film; laminating the protective film with the data of an individual printed on the individual data printing surface thereof over a surface of a gutter portion of sheet including a central folding line of the sheet, to form a laminated data sheet; combining a plurality of visa sheets with the laminated data sheet; binding the combined data sheet and visa sheets with a thread using a sewing machine along the central folding line; double-folding each of the thread-bound sheets along the central folding line; and finish-cutting a front end edge, an upper end edge and a lower end edge of each of the sheets after each of the sheets is double-folded.

From another aspect of the invention, there is provided a method for manufacturing a passport comprising the steps of printing data of an individual on an individual data printing surface of a protective film composed of a see-through synthetic resin film; laminating the protective film with the data of an individual printed on the individual data printing surface thereof over a surface of a gutter portion of a sheet including a central folding line of the sheet; combining a plurality of visa sheets with the laminated data sheet; binding the combined data sheet and visa sheets with a thread using a sewing machine along the central folding line; finish-cutting a peripheral edge portion of each of the thread-bound sheets; and double-folding each of the finish-cut sheets along the central folding line.

The above and other objects and attendant features of the present invention will become manifest to those skilled in the art from a reading of the following description and claims in conjunction with the accompanying drawings which constitute part of this specification.

DETAILED DESCRIPTION OF THE EMBODIMENTS

A passport according to the present invention is manufactured by the following method.

Figure 1:
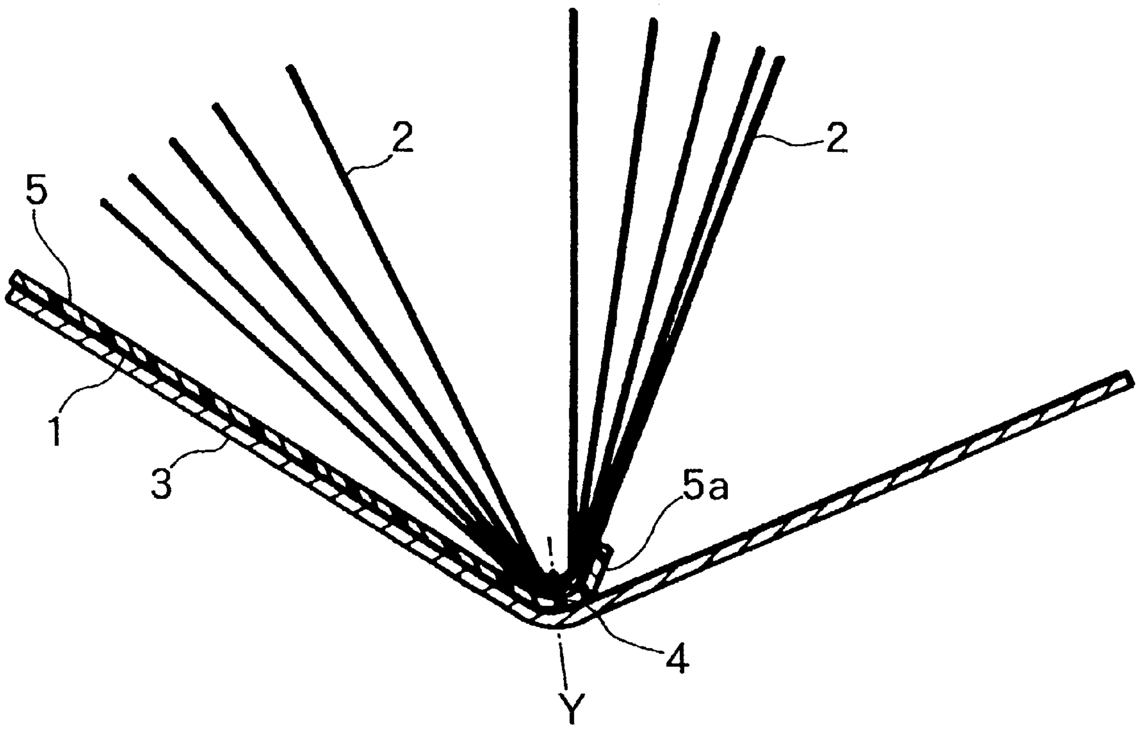
FIG. 1 PRIOR ART
FIG. 1 is a sectional view of a structure of a conventional passport.
Figure 2A:
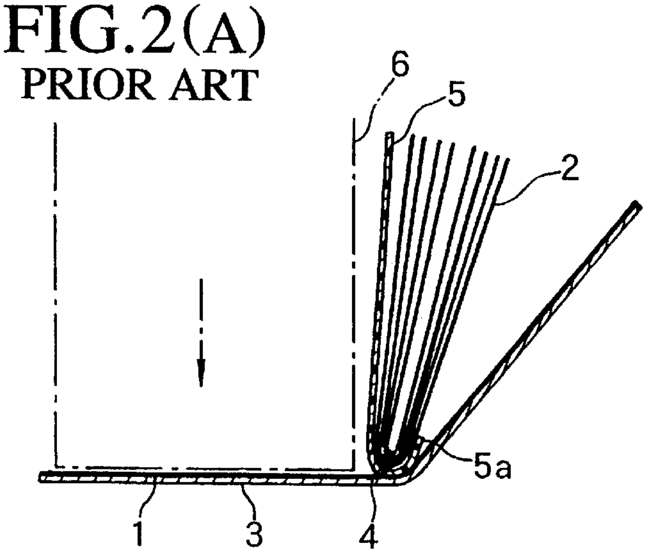
FIG.2(A) PRIOR ART
FIG. 2(A) is a sectional view of a passport for explaining a state in which data of an individual are printed on a conventional bound virgin passport
Figure 2C:
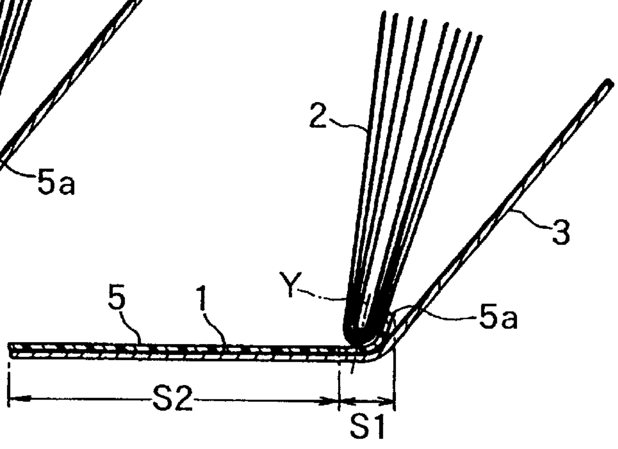
FIG.2(C) PRIOR ART
FIG. 2(C) is a sectional view of a completed passport.
Figure 2B:
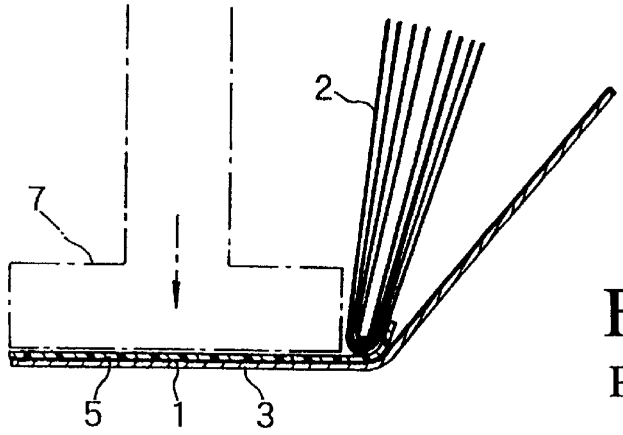
FIG.2(B) PRIOR ART
FIG. 2(B) is a sectional view of a passport for explaining a state in which the data-printed passport is laminated with a protective film.
Figure 2D:
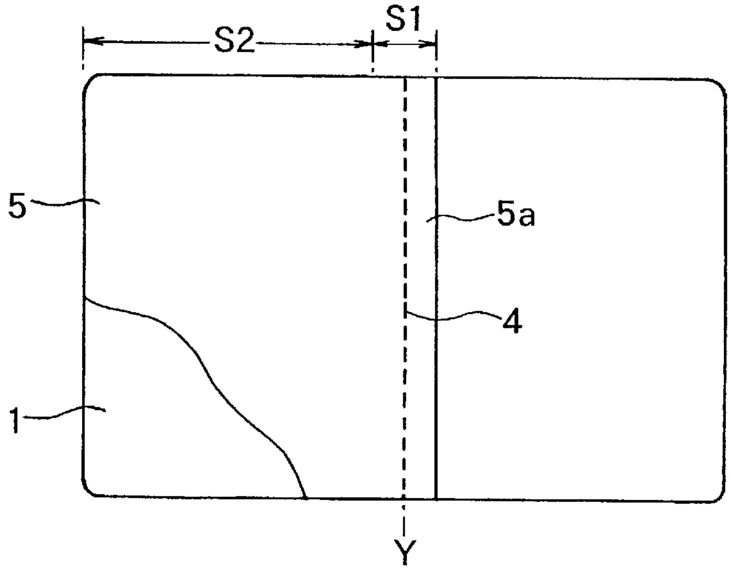
FIG.2(D) PRIOR ART
FIG. 2(D) is a plan view showing an area laminated with a protective film and an area not laminated in the passport.
Figure 3A:
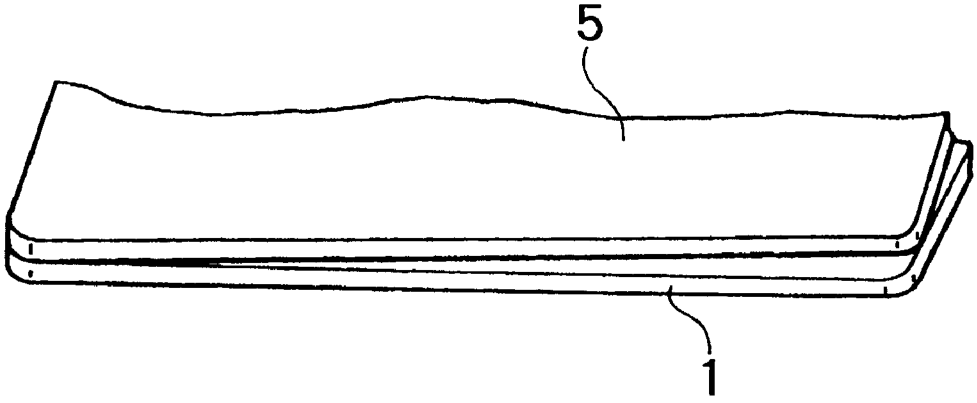
FIG.3(A) PRIOR ART
FIG. 3(A) and 3(B) are perspective views of a main part for explaining the inclination and displacement of the protective film in the conventional passport.
Figure 3B:
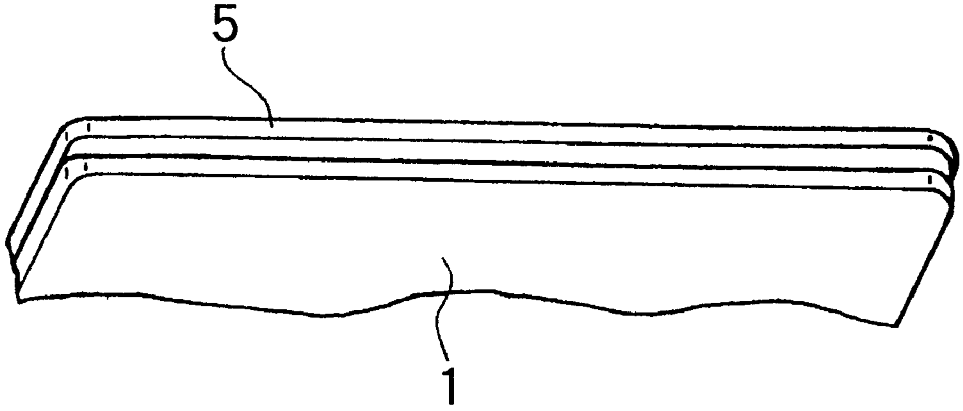
FIG.3(B) PRIOR ART
Figure 4A:
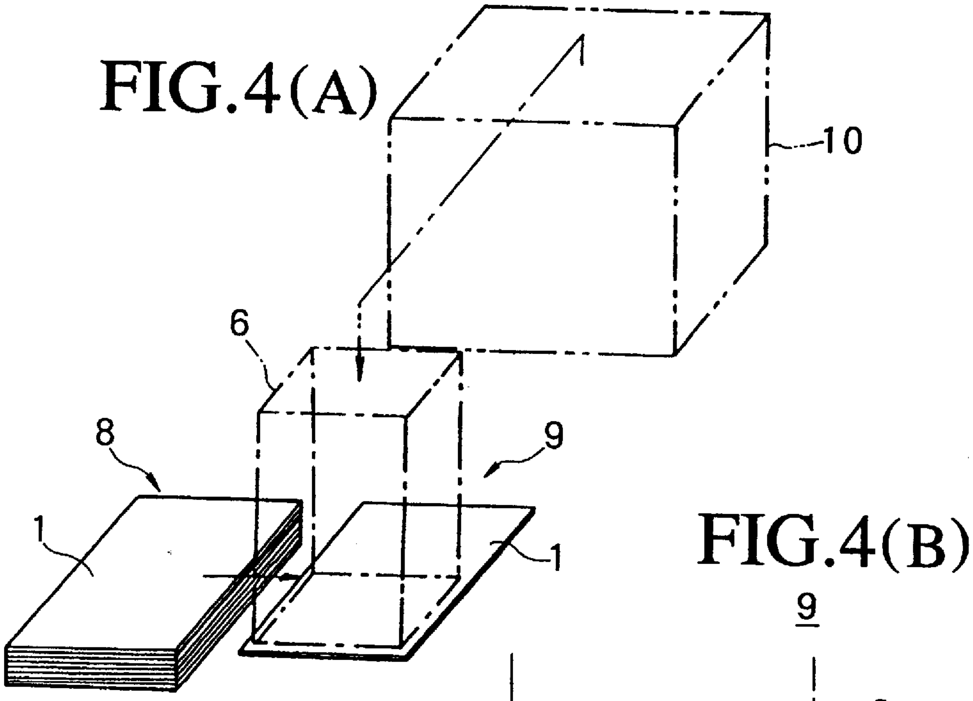
FIG. 4(A) is a perspective view showing a step for printing data of an individual on a data sheet.
Figure 4B:
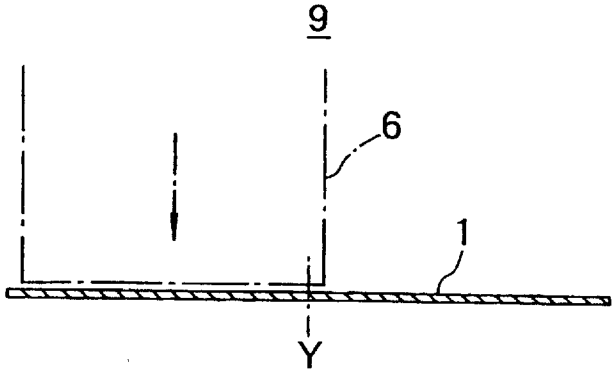
FIG.4(B) is a sectional view of FIG. 4(A), and FIG. 4(A') is a perspective view showing a step for printing data of an individual on a transfer film and laminating the data sheet.

First, as shown in FIGS. 4(A) and 4(B), a plurality of flat data sheets 1 are stacked up and stocked at a stock portion 8, and each data sheet 1 is fed to a printing portion 9 from this stock portion 8, so that data of an individual are printed on the surface of each sheet by a printing machine 6.

Figure 4B:
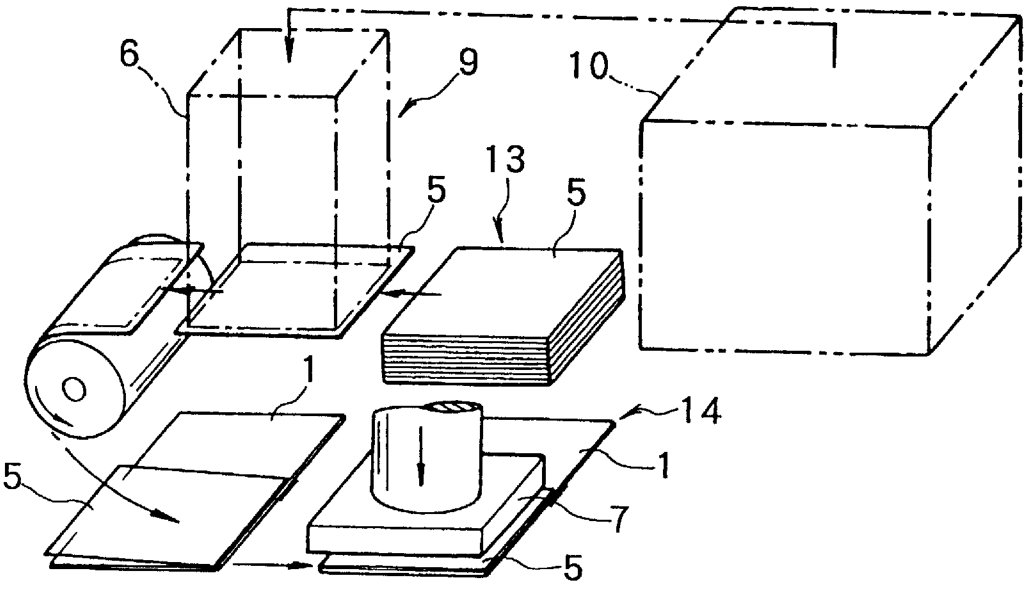

Also, as shown in FIG. 4(A'), data for an individual are printed on the surface (surface opposite the data sheet 1) of a protective film 5 to be laminated with the data sheet 1 and the resultant is subjected to a following laminating step. In this step of FIG. 4(A'), the flat individual's data sheet 1 or protective film 5 is recorded with data of an individual by printing or the like before the individual's data sheet 1 is applied with a binding thread along its central folding line.

Accordingly, data of an individual can be printed directly or through the protective film 5 on a desired part of the flat data sheet 1 without being restricted by the thread binding line as conventionally experienced. For example, when data of an individual are to be printed on the surface of one of two pages bisected with the central folding line Y of the data sheet 1, the data can be printed on an area near the central folding line which is to be bound by a thread at a following step, without being restricted by the thread binding line as conventionally experienced.

As one effective anti-counterfeit method, there is provided a structure in which the data for an individual are printed on an area S1 spreading over a gutter portion of the data sheet 1 including the central folding line Y which will serve as the thread binding line. Some concealed information such as anti-counterfeit information may also be printed on this area S1.

The data of an individual and the anti-counterfeit information are printed, either directly or indirectly, on the entire surface of the data sheet including the left and right pages bisected by the central folding line Y, and the central line Y.

The data of an individual include the individual's face photograph, name, age, sex, present address, permanent address, nationality and the like. A representative example of the printing machine 6 for printing such data for an individual is a laser printer. A stamp type printing machine, a copying machine, a transferring machine, and the like may also be used. A sheet printed by one of such printing machines may be attached to the individual's data sheet 1.

The data of an individual are stored in a data base in a computer 10. The data of an individual are extracted from the data base and given to the printing machine 6, so that the data are printed on the data sheet 1 or the protective film 5. It is important that the extraction of the data of an individual from the data base and the printing of the data are performed before the data sheet is bound by a thread.

The employment of the method for extracting data of each passport applicant from the data base and printing them on each data sheet or protective film makes it possible to complete a data sheet or a protective film with data of an individual printed thereon and laminated, before the sheet or film is bound as a passport.

Figure 5A:
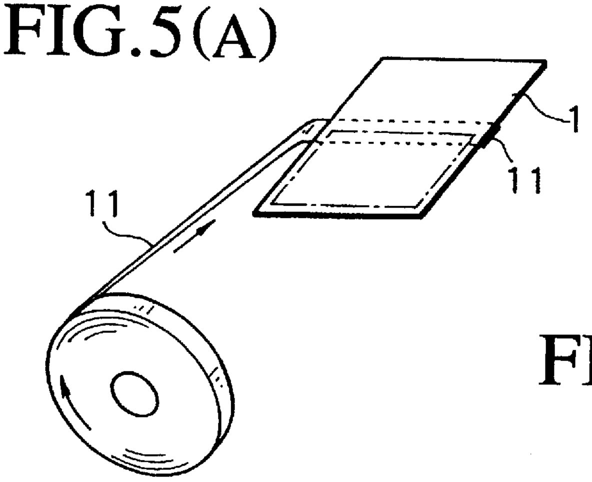
FIG. 5(A) is a perspective view showing a step for attaching a reinforcing tape to the data sheet.
Figure 5B:
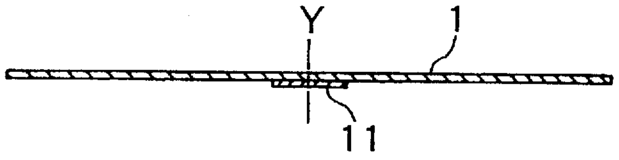
FIG. 5(B) is a sectional view of FIG. 5(A)

As shown in FIG. 5(A) and FIG. 5(B), a reinforcing tape 11 having a small width is bonded to an outer surface of the data sheet 1 on which the data of an individual, etc. are printed along the central folding line Y. This reinforcing tape 11 serves as a means for reinforcing a thread-binding in a process to follow. In this invention, the thread-binding width 5*a* of the protective film 5 is laminated over a gutter portion area of the data sheet 1 including a thread-binding line Y of a process to follow and the binding thread 4 extends through the laminated portion. Accordingly, the reinforcing tape 11 can be subjected to the laminating process of the protective film 5 to follow, without being bonded. This reinforcing tape 11 may be applied before the step for binding a thread is performed.

Figure 6A:
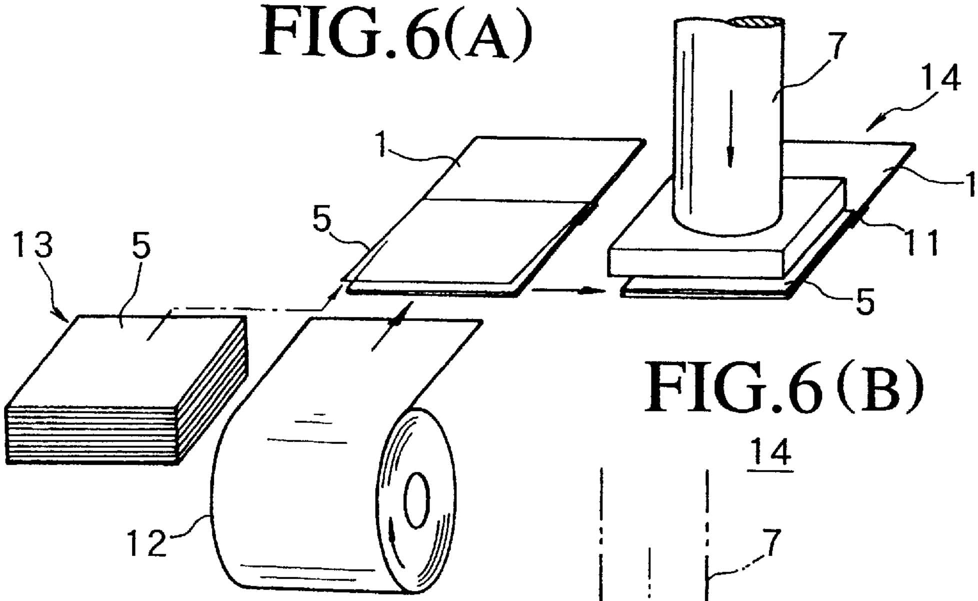
FIG. 6(A) is a perspective view showing a step for feeding a protective film to the data sheet and laminating the sheet with the film.
Figure 6B:
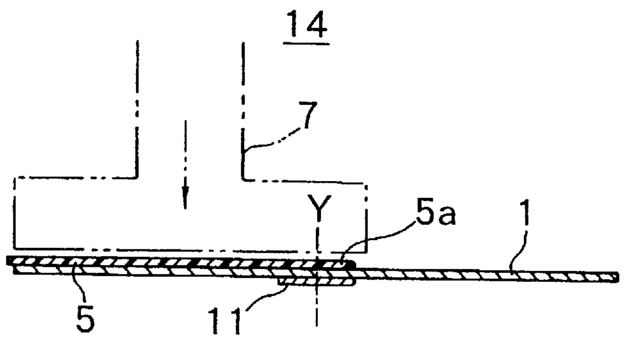
FIG. 6(B) is a sectional view of FIG. 6(A)

As shown in FIG. 6(A) and FIG. 6(B), the protective film 5 composed of a see-through synthetic resin film is laminated with the flat individual's data sheet 1 on which the data of an individual are printed, through a heating plate or a high frequency bonding means 7.

As shown in FIG. 4(A'), the protective film 5 with the data of an individual printed thereon is placed (combined) on the surface of the data sheet 1 and laminated. This step, like the step for printing the data of an individual, means that the protective film 5 is laminated with the flat surface of the data sheet 1 with the data of an individual printed thereon before the step for binding a thread along the central folding line Y of the individual's data sheet 1 is performed.

Figure 6C:
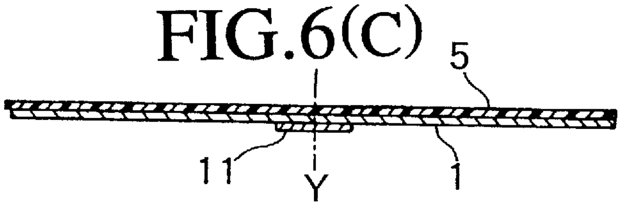
FIG. 6(C) is likewise a sectional view but showing another example of FIG. 6(A)

As shown in FIG. 6(B), the protective film 5 is laminated at least on an area from the surface of the individual's data printing page of the data sheet 1 to the surface of the gutter portion including the central folding line Y of the sheet 1. Here, the data printing page refers to the surface of the sheet 1 on which the data are directly printed, and also to the surface of the sheet 1 on which the protective film with the data printed thereon is laminated. As shown in FIG. 6(C), the protective film 5 may be laminated over the entire flat surface of the individual's data sheet 1.

As shown in FIG. 6(A), the protective film 5 is rolled out of a take-up roll 12 of the film, cut into a predetermined size and then fed to the inner surface of the data sheet 1. In the alternative, the protective films 5 preliminarily cut into a predetermined size are stacked up and stocked, so that the protective films 5 can be fed, one by one, to the inner surface of the data from the stock portion 13 and subjected to the laminating portion 14. The protective film fed to the inner surface of the data sheet 1 is locally bonded at important parts by an adhesive agent or heat sealing so that the film is not displaced and then subjected to the laminating portion 14.

Figure 8A:
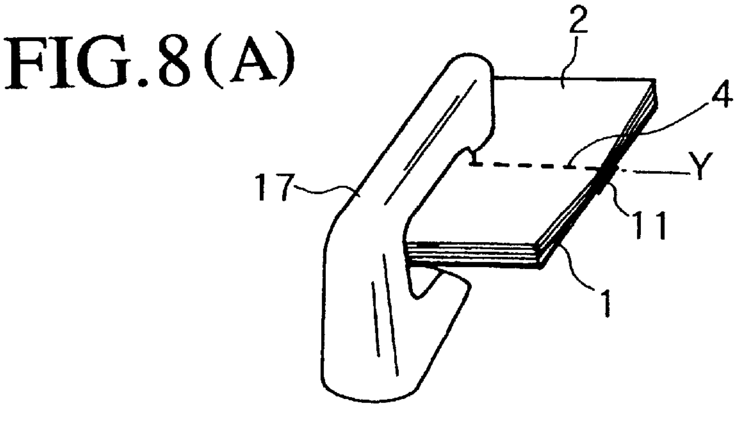
FIG. 8(A) is a perspective view showing a step for binding the combined data sheet and visa sheets with a thread.

At that time, as shown in FIG. 8(A), it is possible that after the data of an individual are printed on the protective film 5, the protective film 5 is subjected to the laminating portion 14 and combined with the data sheet 1 on which no data of an individual are printed.

Figure 7A:
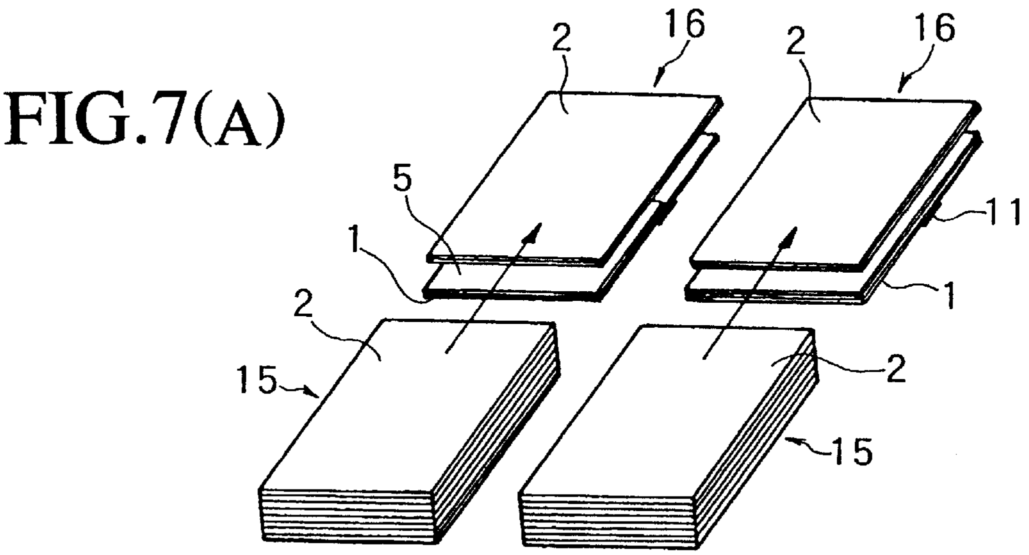
FIG. 7(A) is a perspective view showing a step for combining the laminated data sheet with visa sheets.
Figure 7B:
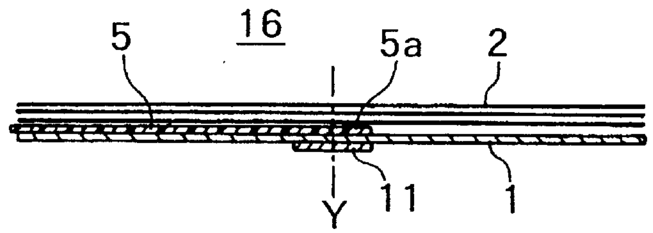
FIG. 7(B) is a sectional view of FIG. 7(A)

As shown in FIG. 7(A) and FIG. 7(B), a plurality of visa sheets 2 are combined with the inner surface of the data sheet 1 on which the protective film 5 is laminated. A plurality of visa sheets 2 preliminarily cut into a predetermined size are stacked up on the stock portion 15 and fed, one by one, to the combining portion 16.

Figure 8B:
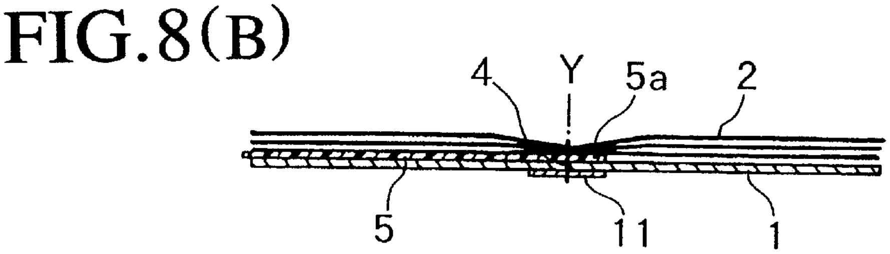
FIG. 8(B) is a sectional view of FIG. 8(A)

As shown in FIG. 8(A) and FIG. 8(B), after the visa sheets 2 are combined with the laminated data sheet 1, a thread binding is applied to the central folding line Y of the sheets 1 and 2 with the use of a sewing machine 17. Accordingly, this thread binding step is performed after the data of an individual are printed directly or indirectly to the data sheet 1 and the protective film 5 is laminated.

As previously mentioned, the protective film 5 has the thread-binding width 5*a* from the surface of the individual's data printing page of the data sheet 1 at least to the guttering portion area S1 of the sheet 1 including the central folding line Y. This thread-binding width 5*a* is laminated on the surface of the data sheet 1.

Figure 16:
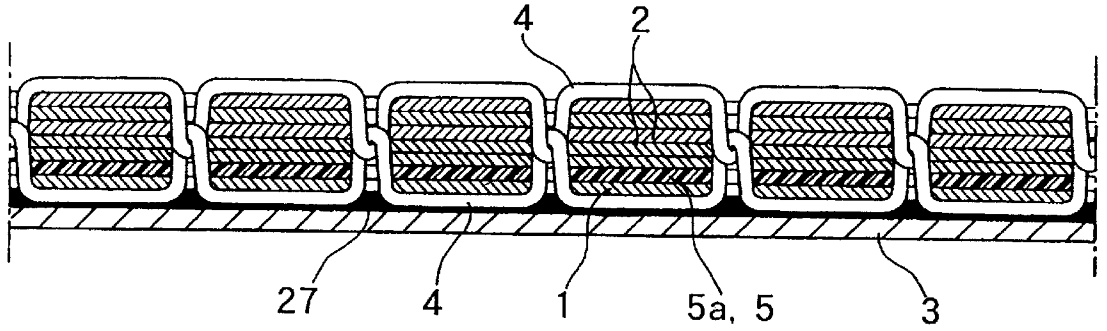
FIG. 16 is a sectional view taken on line XVI—XVI of FIG. 15(A).

Accordingly, as shown in FIG. 16, since the binding thread 4 is caused to extend through the laminated thread-binding width 5*a* and the other sheets 1 and 2 by the sewing machine 17, thread-binding strength is significantly increased.

The thread-binding width 5*a* of the protective film 5 is integrally intimately contacted with the data sheet 1. Accordingly, no tucking-up as conventionally experienced occurs, no hazardous tensile force is applied to the binding thread 4 and no rubbing occurs.

Figure 9A:
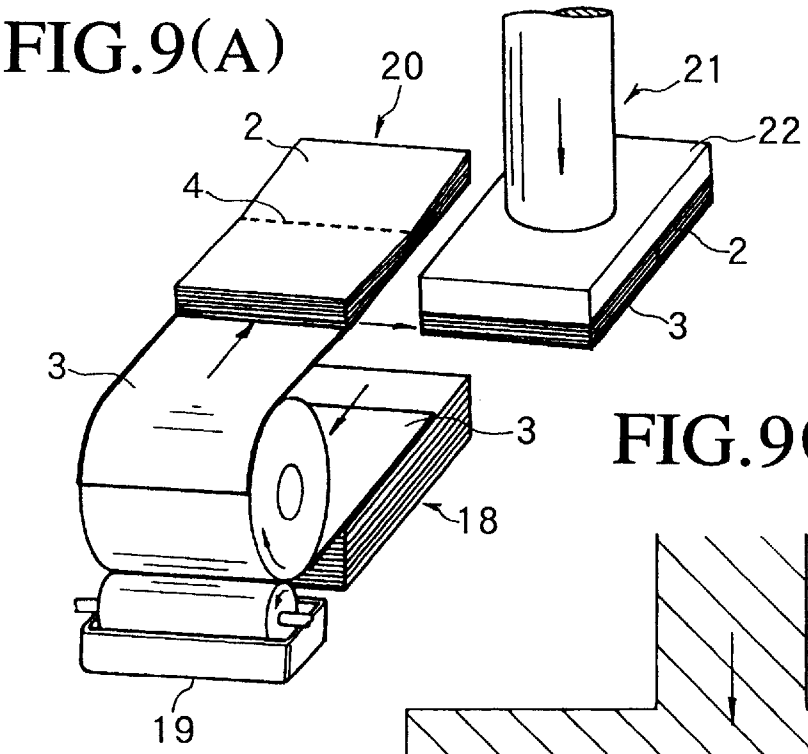
FIG. 9(A) is a perspective view showing a step for combining and attaching a cover sheet to the combined data sheet and visa sheet after they are bound with a thread and FIG. 9(B) is a sectional view of FIG. 9(A)
Figure 9B:
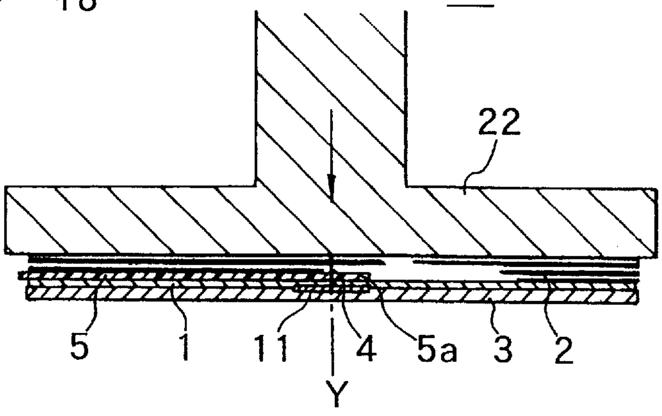

Next, as shown in FIG. 9(A) and FIG. 9(B), a plurality of cover sheets 3 cut into a predetermined size are stacked up on the stock portion 18, and the cover sheets 3 are supplied, one by one, to a bonding portion 19 from the stock portion 18. After an adhesive agent 27 is applied to the inner surface of the cover sheet 3 at the bonding portion 19, the cover sheets 3 are subjected to the combining portion 20 so that the cover sheets 3 are combined and bonded to the outer surface (back surface) of the data sheet at the combining portion 20.

As shown in FIG. 9(A) and 9(B), in accordance with necessity, the data sheet 1, the visa sheets 2 and the cover sheet 3 mutually superimposed are pressed and dried by a pressing means at a pressing portion 21, so that the cover sheet 3 and the data sheet 1 are firmly bonded together.

Figure 10A:
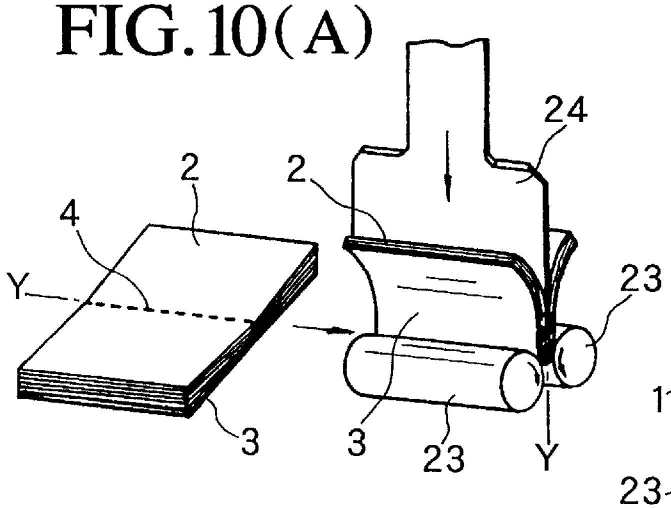
FIG. 10(A) is a perspective view showing a step for double-folding the passport attached with the cover sheet.
Figure 10B:
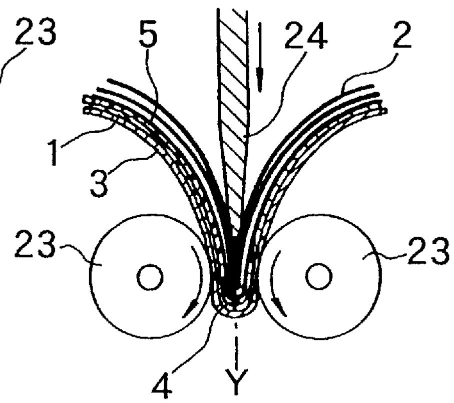
FIG. 10(B) is a sectional view of FIG. 10(A)

Next, as shown in FIG. 10(A) and 10(B), after the laminated data sheet 1 and visa sheets 2 are thread-bound and attached with the cover sheet 3 by an adhesive agent, the sheets 1, 2 and 3 are pushed into a space between folding rolls 23 by a blade 24 at the central folding line (thread-binding line) Y so that the sheets 1, 2 and 3 are double-folded.

By this double-folding, the thread-binding width 5*a* of the protective film 5, which is laminated on the data sheet 1, is bent together with the data sheet along the thread-binding line Y.

Figure 11:
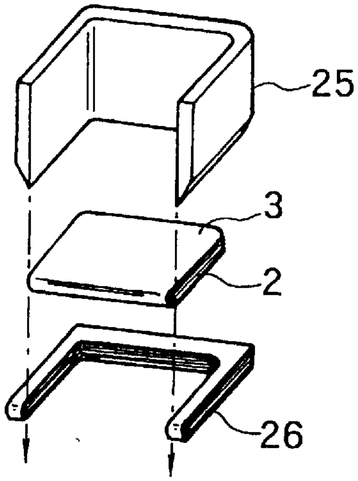
FIG. 11(A) is a perspective view for finishing the double-folded passport by cutting.
FIG. 11(B) is a sectional view of FIG. 11(A)
Figure 11:
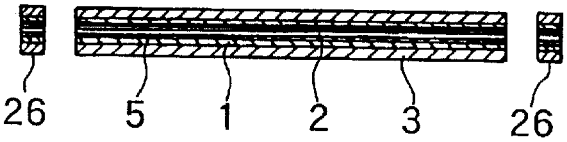

Next, as shown in FIG. 11(A) and FIG. 11(B), after the double-folding step is performed, the sheets 1, 2 and 3 are finish-cut at the front end edge, upper end edge and lower end edge by a cutting means 25. As a consequence, a passport in which the data of an individual are printed and the protective film 5 is laminated is constructed.

Figure 14A:
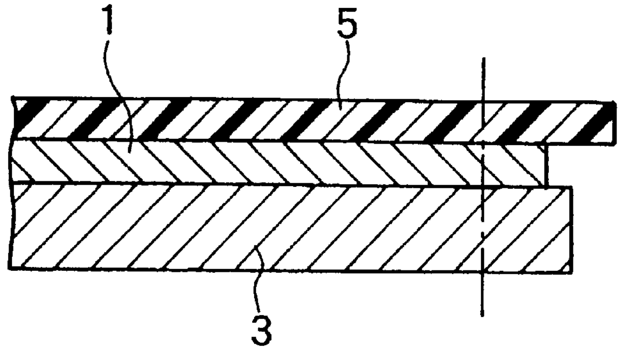
FIG. 14(A) and 14(B) are enlarged sectional views showing the areas of the protective film finished by cutting.
Figure 14B:
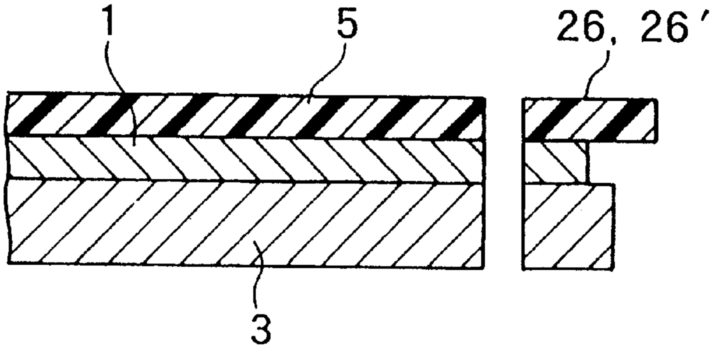

As shown in FIG. 14(A) and 14(B), the front end edge, upper end edge and lower end edge of the protective film 5, which are laminated on the data sheet 1, are cut by the finish-cutting together with other sheets 2 and 3.

By this, the protective film 5 and data sheet 1 can be formed in a completely coincided state. Accordingly, the undesirable phenomena in which the end edge of the protective film 5 is extended out from the end edge of the data sheet 1 and the data printing surface is exposed as conventionally experienced are completely obviated, thus providing a passport which is effectively in protects of data and prevents counterfeiting. Reference 26 denotes a cut piece removed by the finish-cutting.

Figure 12:
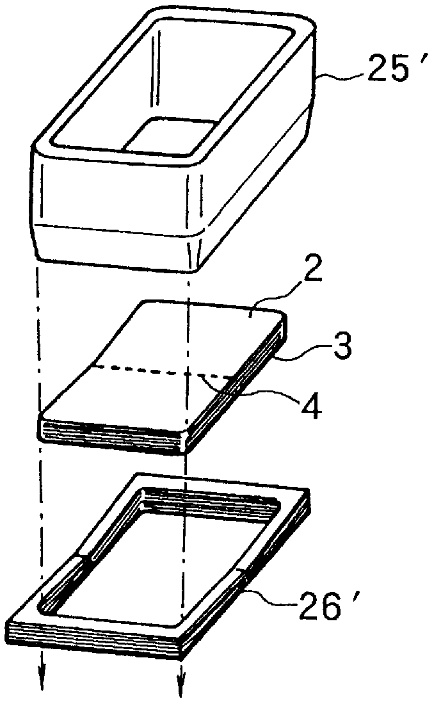
FIG. 12 is a perspective view showing a manufacturing method in which the passport obtained through the steps of FIGS. 9(A) and )(B) is finished by cutting before the passport is double-folded.
Figure 13:
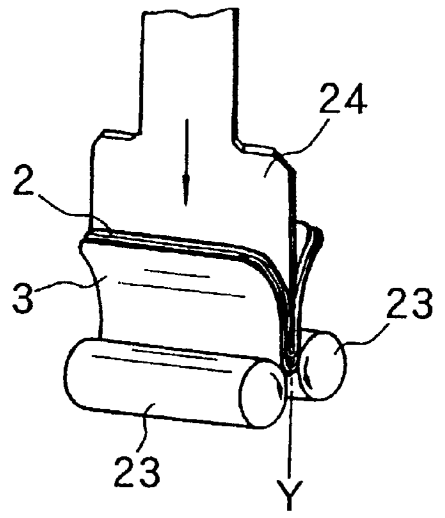
FIG. 13 is a perspective view showing a step for double-folding the passport already finished by cutting.

FIG. 12 and FIG. 13 show another method for manufacturing the above passport. According to this method, after the data sheet 1 and visa sheets 2 are thread-bound and the cover sheet 3 is bonded through an adhesive agent 27 according to the manufacturing method of FIGS. 4(A) (FIG. 4(A')) through 9(A) and 9(B), the entire peripheral edges of the sheets 1, 2 and 3 are removed by finish-cutting with the use of the cutting means 25' as shown in FIG. 12. Reference numeral 26' denotes a cut piece removed by this finish-cutting.

After the finish-cutting is performed, as shown in FIG. 13, the respective sheets are pushed into a space between the folding rolls 23 and double-folded along the central folding line (thread-binding line Y), so that a passport, in which data of an individual are printed and the protective film 5 is laminated, is constructed.

Figure 15A:
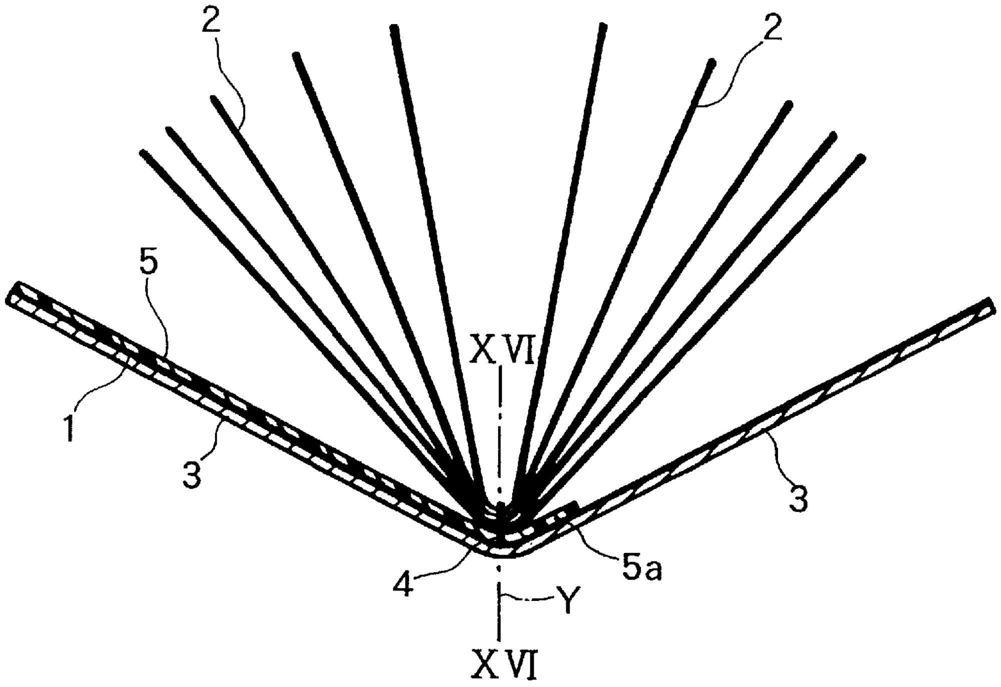
FIG. 15(A) and 15(B) are sectional views showing structures of two kinds of passports obtained through the above manufacturing method.
Figure 15B:
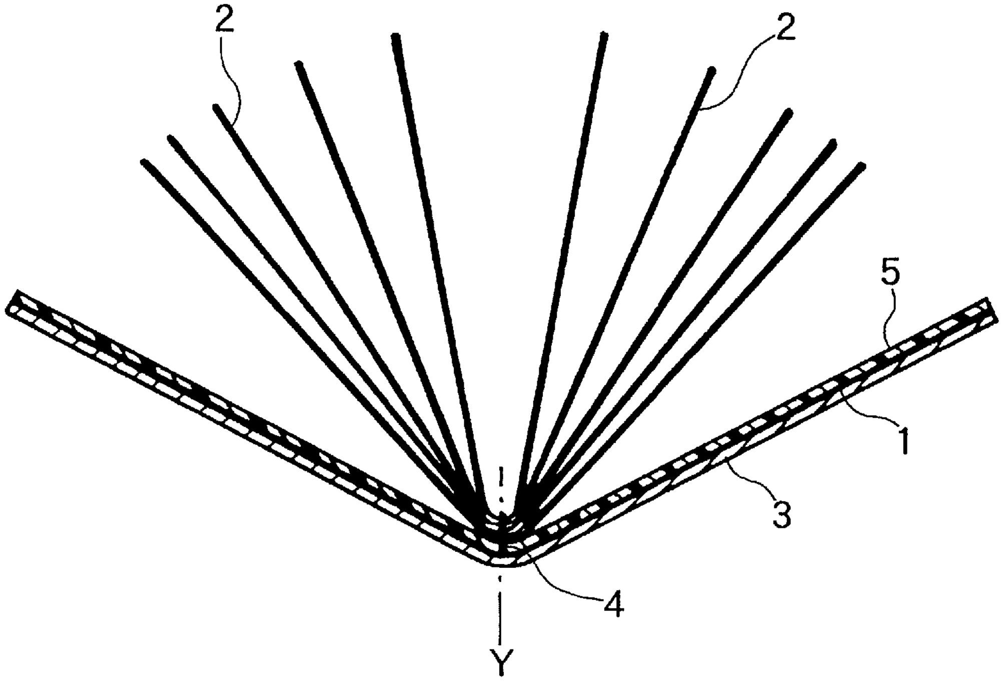

By the procedures so far described, as shown in FIG. 15(A) and FIG. 15(B), the data of an individual are printed on the flat inner surface of the individual's data sheet 1 and the protective film 5 is assembled before the data sheet 1 laminated on the area including the central folding line Y is thread-bound. Then, the laminated data sheet 1 is combined with the visa sheets 2 and the cover sheet 3, and the sheets 1 and 2 are thread-bound along the central folding line Y. As a consequence, there can be obtained a passport in which the binding thread 4 is allowed to extend through the thread-binding width 5*a* laminated on the guttering portion of the data sheet 1 and bound, and the cover sheet 3 is bonded to the outer surface of the data sheet by the adhesive agent 27.

FIG. 15(A) shows a passport obtained by forming the thread-binding width 5*a* of the protective film 5 slightly expanded into the area including the thread-binding line Y of the data sheet 1 and laminating the thread-binding width 5*a* over the guttering portion area of the data sheet including the thread-binding line Y, and FIG. 15(B) shows a passport obtained by laminating the protective film 5 over the entire surface of the data sheet. In any of the above passports, the binding thread is applied by a sewing machine through the laminating portion.

The present invention provides in a passport comprising a data sheet 1 of an individual and a plurality of visa sheets 2 combined with the data sheet 1 and bound by a thread along a central folding line, a surface of an individual's data printing page of the data sheet 1 being laminated with a protective film 5 composed of a see-through synthetic resin film, an anti-counterfeit structure of the passport being characterized in that the protective film 5 is laminated over a gutter portion of the data sheet 1 including the thread binding line Y, and the thread binding is performed through the laminated area of the gutter portion.

According to the present invention, a sequential operation including the step for binding a passport, printing data of an individual and lamination can be integrally preformed on a single line. This makes it possible to extensively reduce the time for issuing a passport and to decrease the manufacturing cost. In addition, the system for issuing a passport can significantly be rationalized.

Also, according to the anti-counterfeit structure of a passport, since the binding thread is applied through the laminated thread-binding width by a sewing machine, the strength of thread-binding is increased and the problems of loosening, etc. caused by tensile force and rubbing of the binding thread can effectively be obviated. In addition, since the data of an individual and anti-counterfeit information can freely be printed on an area including the thread binding line, the structure of the present invention provides a good anti-counterfeit measure.

The foregoing is considered as illustrative only of the principles of the present invention. Further, since numerous modifications and changes will readily occur to those skilled in the art, it is not desired to limit the present invention to the exact construction and operation shown and described. Accordingly, all suitable modifications and equivalents may be resorted to, falling within the scope of the present invention and the appended claims and their equivalents.

What is claimed is:

1. A method for manufacturing a passport comprising: printing data of an individual on an inner, individual data printing surface of an individual data sheet; laminating a protective film composed of a see-through synthetic resin film over the individual data printing surface of the individual data sheet and a gutter portion of the individual data sheet which includes a central folding line of said individual data sheet after the data of an individual are printed, so as to form a laminated data sheet; combining a plurality of visa sheets with said laminated data sheet; binding said combined laminated data sheet and visa sheets with a thread using a sewing machine along the central folding line; and double-folding each of said thread-bound sheets along the central folding line; and finish-cutting a front end edge, an upper end edge and a lower end edge of each of said sheets after each of said sheets is double-folded.

2. A method for manufacturing a passport comprising: printing data of an individual on an inner, individual data printing surface of an individual data sheet; laminating a protective film composed of a see-through synthetic resin film over the individual data printing surface of said individual data sheet and a gutter portion of said individual data sheet which includes a central folding line of said individual data sheet after the data of an individual are printed, so as to form a laminated data sheet; combining a plurality of visa sheets with said laminated data sheet; binding said combined laminated data sheet and visa sheets with a thread using a sewing machine along the central folding line; and finish-cutting a peripheral edge portion of each of said thread-bound sheets; and double-folding each of said finish-cut sheets along the central folding line.

3. A method for manufacturing a passport comprising: printing data of an individual on an individual data printing surface of a protective film composed of a see-through synthetic resin film; laminating said protective film with the data of an individual printed on said individual data printing surface thereof over a surface of a gutter portion of a sheet including a central folding line of said sheet, to form a laminated data sheet; combining a plurality of visa sheets with said laminated data sheet; binding said combined laminated data sheet and visa sheets with a thread using a sewing machine along the central folding line; double-folding each of said thread-bound sheets along the central folding line; and finish-cutting a front end edge, an upper end edge and a lower end edge of each of said sheets after each of said sheets is double-folded.

4. A method for manufacturing a passport comprising: printing data of an individual on an individual data printing surface of a protective film composed of a see-through synthetic resin film; laminating said protective film with the data of an individual printed on said individual data printing surface thereof over a surface of a gutter portion of a sheet including a central folding line of said sheet; combining a plurality of visa sheets with said laminated data sheet; binding said combined laminated data sheet and visa sheets with a thread using a sewing machine along the central folding line; finish-cutting a peripheral edge portion of each of said thread-bound sheets; and double-folding each of said finish-cut sheets along the central folding line.

* * * * *